United States Patent
Kato

(10) Patent No.: US 7,596,297 B2
(45) Date of Patent: Sep. 29, 2009

(54) INFORMATION PROCESSING APPARATUS AND METHOD PROGRAM, AND RECORDING MEDIUM

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 739 days.

(21) Appl. No.: 10/494,048

(22) PCT Filed: Sep. 17, 2003

(86) PCT No.: PCT/JP03/11819

§ 371 (c)(1),
(2), (4) Date: May 11, 2004

(87) PCT Pub. No.: WO2004/032494

PCT Pub. Date: Apr. 15, 2004

(65) Prior Publication Data

US 2005/0078942 A1 Apr. 14, 2005

(30) Foreign Application Priority Data

Oct. 1, 2002 (JP) ............................... 2002-288924

(51) Int. Cl.
H04N 5/00 (2006.01)
H04N 5/91 (2006.01)
H04N 5/93 (2006.01)
H04N 7/00 (2006.01)
H04N 7/01 (2006.01)
H04N 7/12 (2006.01)
H04N 7/26 (2006.01)
H04N 9/11 (2006.01)
H04N 9/79 (2006.01)
G06F 3/038 (2006.01)
G06F 17/00 (2006.01)

(52) U.S. Cl. ............................ 386/68; 386/40; 386/46; 386/52; 386/55; 386/65; 386/111; 386/123; 386/124; 386/125; 386/126; 345/204; 348/97; 348/429.1; 348/441; 348/443; 348/445; 348/448; 348/458; 348/459; 348/474; 375/240.15; 375/240.2; 707/102

(58) Field of Classification Search ................... 386/68, 386/40, 46, 52, 55, 65, 111, 123, 124, 125, 386/126; 348/429.1, 441, 443, 445, 448, 348/458, 474, 97, 459, E7.012, E7.015; 375/240.15, 375/240.2, E7.129, E7.191; 707/102; 345/204
See application file for complete search history.

(56) References Cited

U.S. PATENT DOCUMENTS 5,461,420 A * 10/1995 Yonemitsu et al. ..... 375/240.15

(Continued)

FOREIGN PATENT DOCUMENTS

JP 11-18052 1/1999

(Continued)

Primary Examiner—Thai Tran
Assistant Examiner—Syed Y Hasan
(74) Attorney, Agent, or Firm—Oblon, Spivak, McClelland, Maier & Neustadt, L.L.P.

(57) ABSTRACT

An encoded bit stream having a frame rate of 24 Hz or 23.976 Hz and a progressive format for both NTSC and PAL is recorded on a recording medium. An encoded stream reproduced from the recording medium is supplied to a decoder 20. In the decoder 20, the encoded stream is decoded and 24 p or 23.976 p video is obtained. A video converting portion 25 converts the reproduced video into a display video in accordance with the display format of a monitor 26. For the NTSC range, 29.97 i or 59.94 p display format can be used. For the PAL range, 25 i or 50 p display format can be used.

6 Claims, 13 Drawing Sheets

U.S. PATENT DOCUMENTS

| | | | |
|---|---|---|---|
| 5,517,248 A * | 5/1996 | Isoda | 348/459 |
| 5,754,248 A * | 5/1998 | Faroudja | 348/474 |
| 6,326,999 B1 * | 12/2001 | Wise | 348/441 |
| 6,470,142 B1 * | 10/2002 | Isozaki et al. | 386/124 |
| 6,727,958 B1 * | 4/2004 | Shyu | 348/581 |
| 6,871,003 B1 * | 3/2005 | Phillips et al. | 386/55 |
| 2002/0101924 A1 * | 8/2002 | Suzuki et al. | 375/240.2 |
| 2002/0171758 A1 * | 11/2002 | Kondo et al. | 348/441 |
| 2003/0020699 A1 * | 1/2003 | Nakatani et al. | 345/204 |
| 2004/0081437 A1 * | 4/2004 | Asada et al. | 386/131 |
| 2005/0196151 A1 * | 9/2005 | Takagi et al. | 386/124 |

FOREIGN PATENT DOCUMENTS

| | | |
|---|---|---|
| JP | 11-133935 | 5/1999 |
| JP | 11-146348 | 5/1999 |
| JP | 2000-92458 | 3/2000 |
| JP | 2001-218172 | 8/2001 |

* cited by examiner

V = 480 LINES

H = 720 PIXELS

▨ top_field
☐ bottom_field

525 LINES

VERTICAL BLANKING

HORIZONTAL BLANKING

EFFECTIVE REGION

V = 480 LINES

H = 720 PIXELS

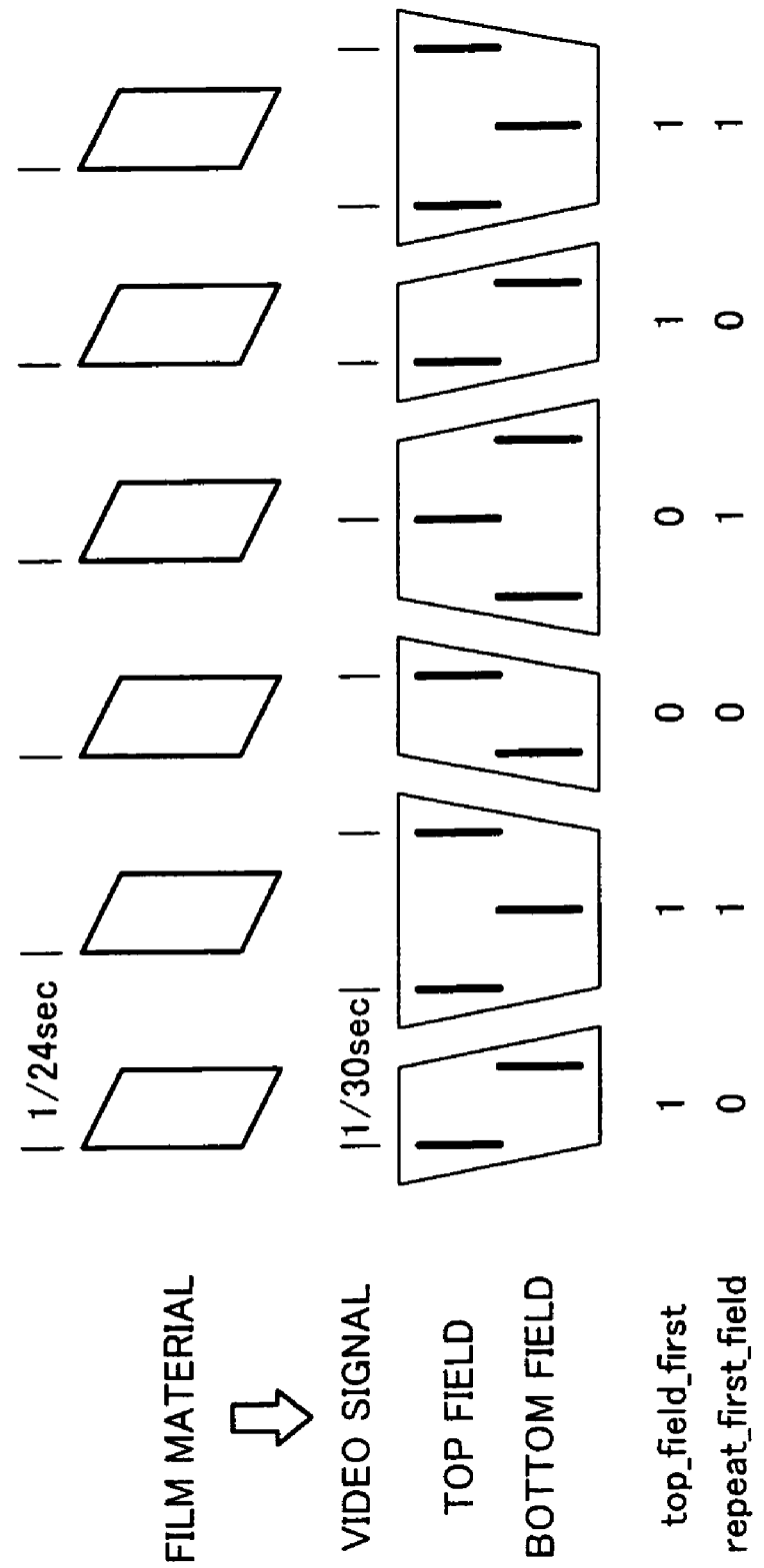

| HxV | FRAME RATE PROGRESSIVE/INTERLACE |
|---|---|
| 1920 × 1080 | 29.97i (FOR NTSC RANGE)<br>25i (FOR PAL RANGE) |
| 1280 × 720 | 59.94p (FOR NTSC RANGE)<br>50p (FOR PAL RANGE) |

| HxV | FRAME RATE PROGRESSIVE/INTERLACE |
|---|---|
| 1920 × 1080 | 24p (AND/OR 23.976p) (FOR BOTH NTSC RANGE AND PAL RANGE) |
| 1280 × 720 | 24p (AND/OR 23.976p) (FOR BOTH NTSC RANGE AND PAL RANGE) |

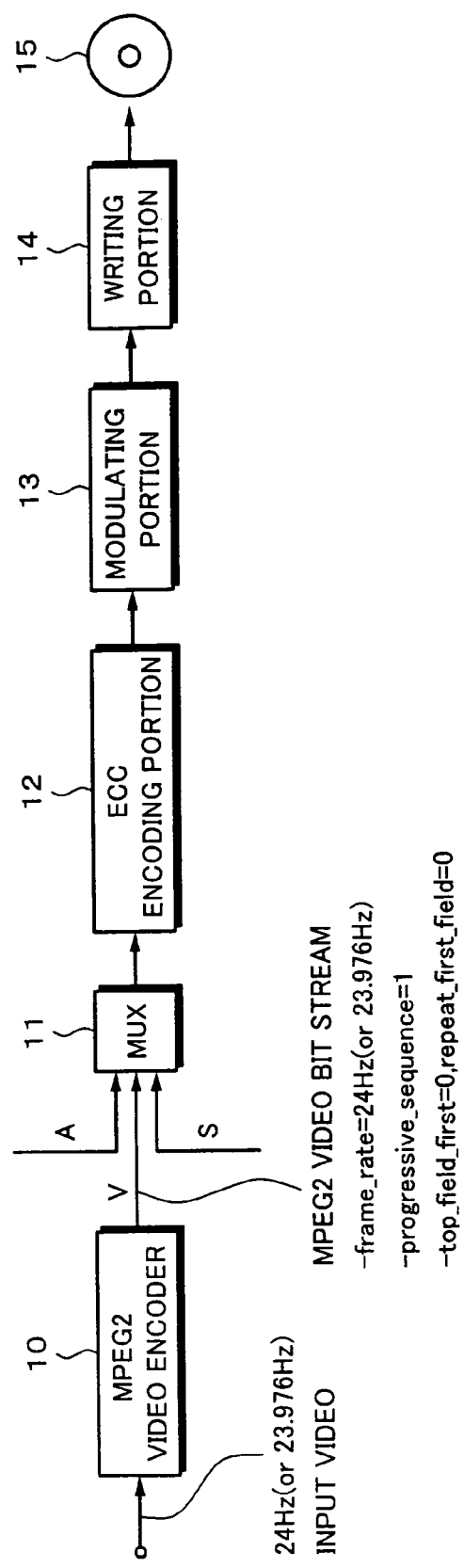

Fig. 7

| DISC FORMAT | CONVERSION OF VIDEO DISPLAY FORMAT | |
|---|---|---|
| 24p | NTSC RANGE | 24p to 29.97i<br>24p to 59.94p |
| 24p | PAL RANGE | 24p to 25i<br>24p to 50p |
| 23.976p | NTSC RANGE | 23.976p to 29.97i<br>23.976p to 59.94p |
| 23.976p | PAL RANGE | 23.976p to 25i<br>23.976p to 50p |

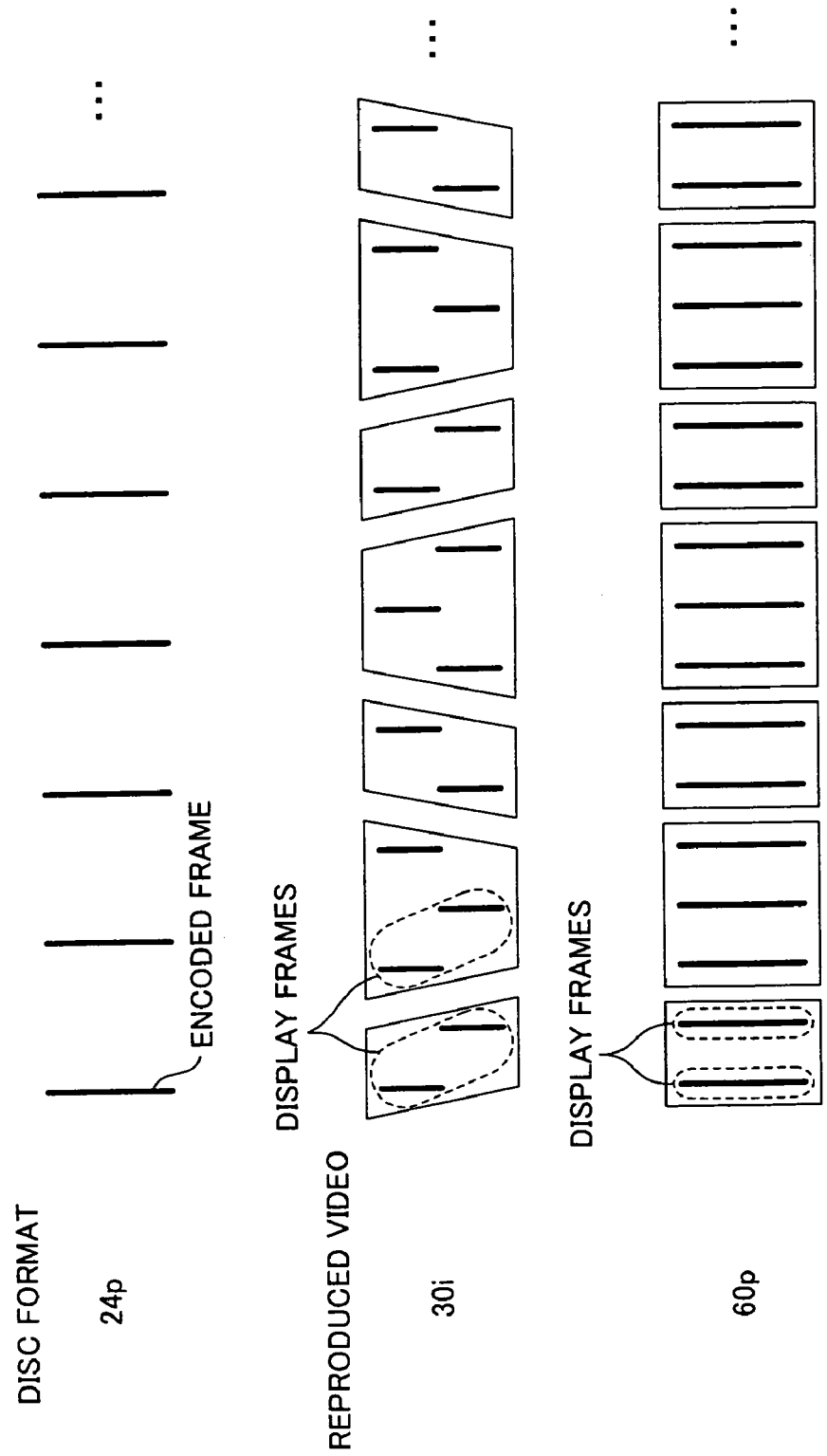

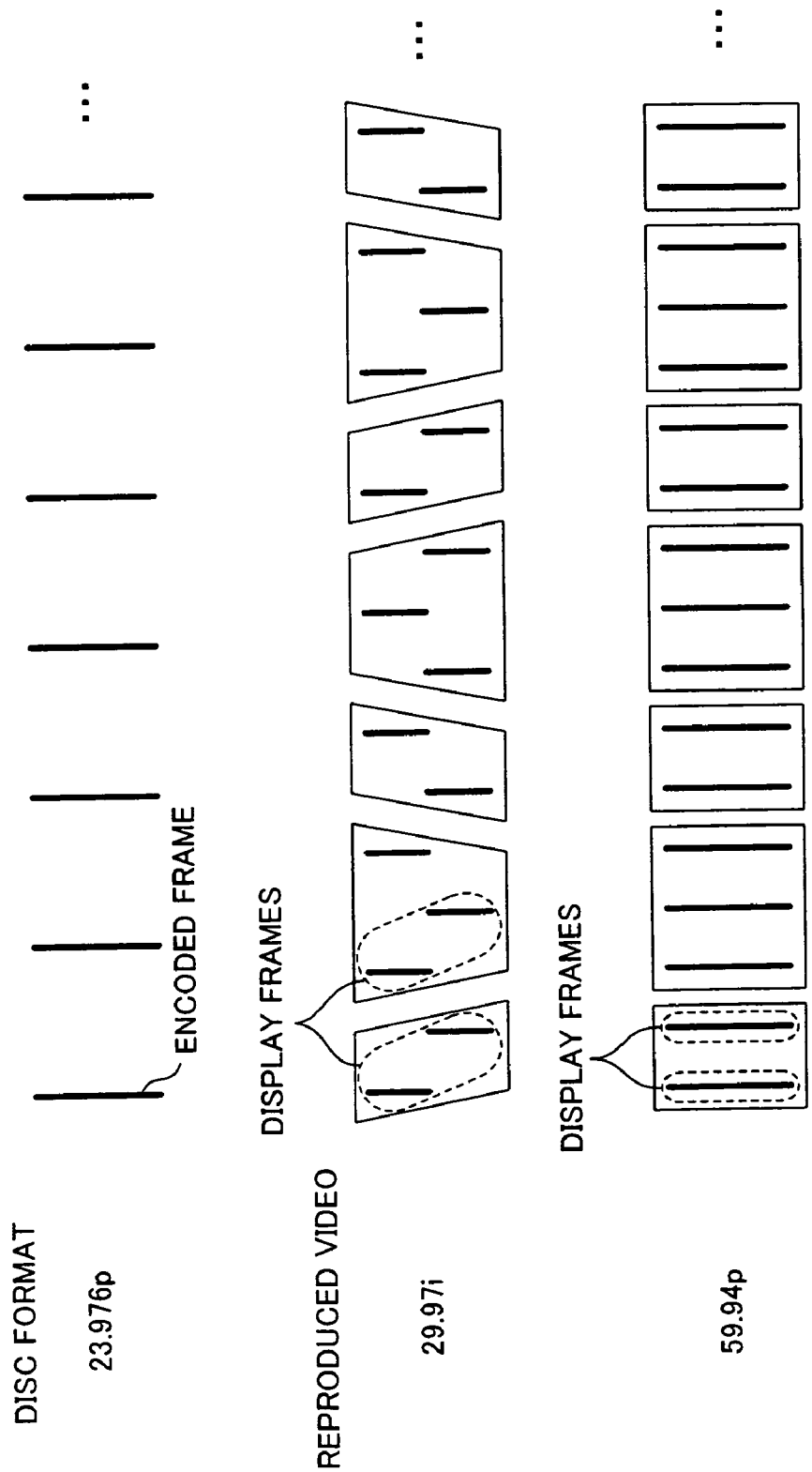

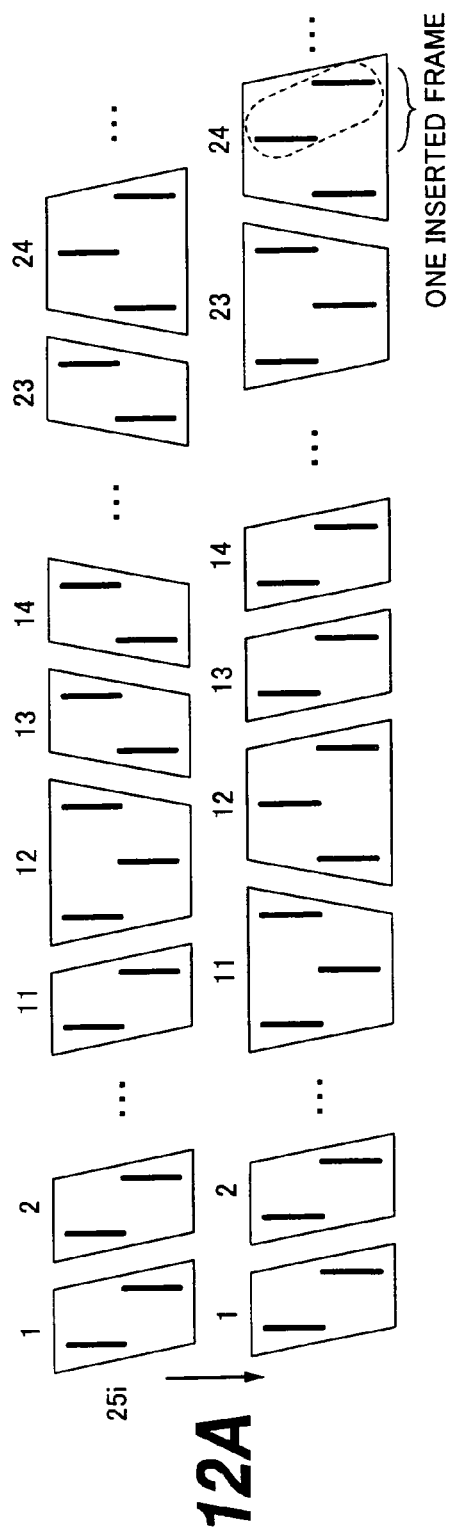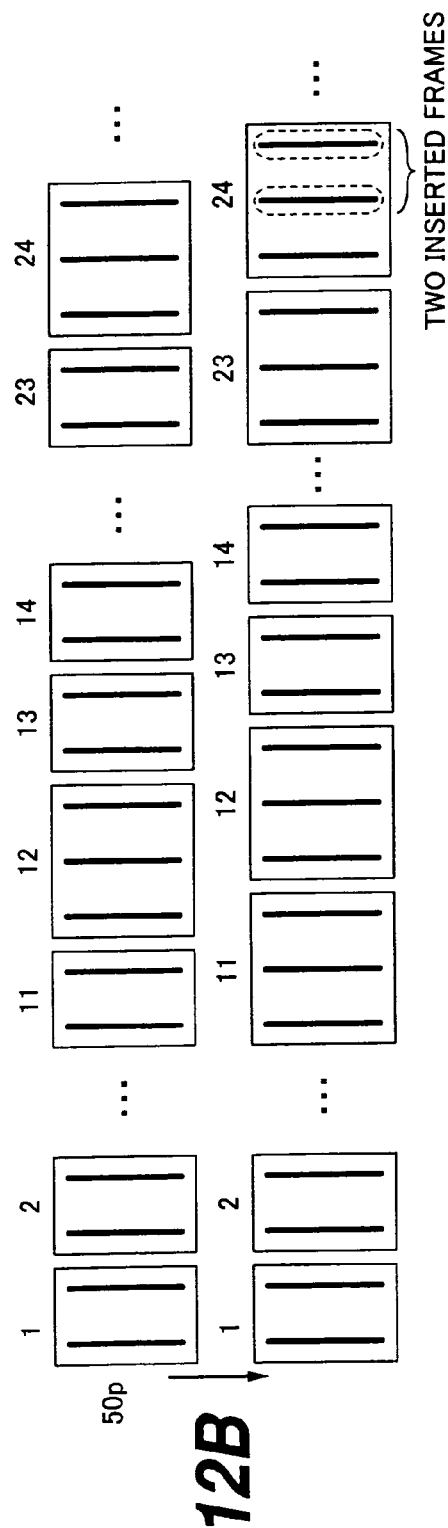
Fig. 12A
Fig. 12B

INFORMATION PROCESSING APPARATUS AND METHOD PROGRAM, AND RECORDING MEDIUM

TECHNICAL FIELD

The present invention relates to an information processing apparatus and a method for recording sub data that is reproduced in synchronization with main audio and video data and to a program for the information processing apparatus and a recording medium on which the program for the information processing apparatus is recorded.

BACKGROUND ART

A technology for recording a transport stream of video data that has been encoded in accordance with MPEG2 (Moving Picture Experts Group Phase 2) to a recording medium for example an optical disc is described in for example Patent Document 1 (Japanese Patent Laid-Open Publication No. 2002-158972).

FIG. 1 shows a picture format of a frame structure of which a video signal is encoded in accordance with the MPEG. In FIG. 1, dirk stripes represent lines of a top field (top_field), whereas white stripes represent lines of a bottom field (bottom_field). In the NTSC transmission picture signal format having an aspect ratio of (4:3), one frame has a total of 480 lines of 240 lines of the top field and 240 lines of the bottom field. The number of pixels in the horizontal direction is 704 pixels. One bit flag top_field_first of header information of the picture layer represents which of the top field and bottom field is chronologically first displayed. When top_field_first=1, the top field is chronologically first displayed.

FIG. 2 shows a spatial relation between the format of an MPEG decoded picture and the format of a transmission picture. The format of the transmission picture is the NTSC format having an aspect ratio of 4:3. An effective pixel area (pixel area of an MPEG decoded picture) of one frame is composed of 780 pixels×480 lines. The transmission picture format includes non-effective areas of a horizontal blanking area and a vertical blanking area.

In addition to the foregoing flag top_field_first, another flag repeat_first_field is also transmitted. The flag repeat_first_field is a flag that represents that there is a repeat field. A film material such as a movie is data composed of 24 frames per second. In contrast, a video signal for example an NTSC format video signal has a format of 30 frames pre second. Thus, when a film material is converted into a video signal, a process for generating 30 frames using 24 frames is required. Such a process includes a process for converting two fields into three fields in accordance with a predetermined conversion pattern. Thus, such a process is generally referred to as 2:3 pull down. In other words, the first field is automatically and repeatedly generated twice every five frames. As a result, 24 frames are converted into 30 frames.

When a video signal that has been obtained by the foregoing 2:3 pull down process is compressed in accordance with the MPEG, since information of fields (repeat fields) that have been inserted for increasing the number of frames is redundant, the video signal is encoded so that the repeat fields are removed and the compression efficiency is improved. A process for detecting repeat fields of video data of which 24 frames per second are converted into 30 frames per second by the 2:3 pull down process, removing the repeat fields, and decreasing the number of frames to 24 frames per second is referred to as inverse 2:3 pull down process.

Next, with reference to FIG. 3, the process for converting a film material of 24 frames per second into an NTSC format television material of 30 frames per second, namely the 2:3 pull down process, will be described. A film material is composed of two frames per second. Two fields (first and second fields) of the same picture are composed of each field of the film material. As a result, a picture signal of 48 fields per second is generated. Thereafter, four frames (eight fields) of the film material are converted into five frames (10 fields) of a video signal, for example an NTSC format video signal.

In FIG. 3, a chronologically last field of three fields surrounded by a trapezoid is a field that is repeated to increase the number of fields, namely a repeat first field. The repeat first field takes place twice every five frames. The video signal for which the 2:3 pull down process has been performed is accompanied by two flags top_field_first and repeat_first_field. In the frame first structure, the flag top_field_first is a flag that represents whether the first field is top or bottom. The flag repeat_first_field is a flag that represents that there is a repeat field.

As described above, when a video signal is encoded in accordance with the MPEG2 and the frame frequency of the NTSC format is 29.97 Hz, values of the two flags top_field_first and repeat_first_field are set for each picture. In addition, frame_rate of the sequence header is set for 29.97 Hz.

As another television format, PAL format is also known as well as the NTSC format. The PAL format whose aspect ratio is (4:3) has a frame frequency of 25 Hz and a structure of which one frame is composed of 720 (pixels)×576 (lines). In the PAL format, basically, top_field_first=1, repeat_first_field=0, and frame_rate of the sequence header=25 Hz are set. In other words, a top field and a bottom field are made of one frame of a movie. The obtained video signal is recorded on a recoding medium. Thus, in the PAL format, the reproduction speed of the video signal is faster than that of the original movie by 25/24 times.

As described above, in a standard resolution format, the NTSC format is different from the PAL format in the picture size and the frame rate. However, in for example a high resolution (HD: High Definition) format, the picture size of the NTSC format is the same as that of the PAL format. Thus, when a movie source is converted into a video signal in each format, it is necessary to convert only the frame rate. These two formats whose frame rates are different and whose picture sizes are common are referred to as NTSC range and PAL range.

Conventionally, the format of an original video signal converted into an NTSC video signal was different from the format of an original video signal converted into a PAL video signal. Thus, to author a recording medium on which for example a movie source is recorded, video signals that can be suitably converted into both the formats should be prepared. Thus, it was laborious to handle video signals in both the formats.

Recently, a progressive format display monitor has been used. So far, in the NTSC format, it was difficult to convert a 29.97 Hz interlaced moving picture into a 59.94 (=2×30× (1000/1001)) Hz progressive moving picture and display the converted picture. Since a video signal for which the 2:3 pull down process had been performed may have been irregularly encoded, it was not easy to detect a progressive frame from a decoded moving picture of an MPEG2 video stream.

In addition, in the PAL format, a movie source of 24 frames per second is fast reproduced at a frame rate of 25 Hz. Thus, the reproduction speed of a video signal is faster than that of an original movie by 25/24 times. As a result, the pitch of audio becomes high.

Thus, an object of the present invention is to provide an information processing apparatus and method, a program, and a recording medium that allow encoding to be performed in common with the NTSC range and the PAL range, a moving picture of the NTSC range to be easily converted into a 59.94 Hz progressive moving picture, and a reproduction speed of the PAL range to be prevented from being increased by 25/24 times over that of the original.

DISCLOSURE OF THE INVENTION

To solve the foregoing problem, claim 1 of the present invention is an information processing apparatus for recording a video signal that can be displayed at all frame rates of 29.97 Hz, 59.94 Hz, 25 Hz, and 50 Hz on a recording medium, comprising:

compression encoding means for generating an encoded video bit stream having a size in common with an NTSC range and a PAL range, a frame rate of 24 Hz or 23.976 Hz, and a progressive format; and recording means for recording the encoded video bit stream on the recording medium.

A non-limiting embodiment of the present invention is an information processing method for recording a video signal that can be displayed at all frame rates of 29.97 Hz, 59.94 Hz, 25 Hz, and 50 Hz on a recording medium, comprising the steps of:

generating an encoded video bit stream having a size in common with an NTSC range and a PAL range, a frame rate of 24 Hz or 23.976 Hz, and a progressive format; and recording the encoded video bit stream on the recording medium.

A non-limiting embodiment of the present invention is a program for an information processing apparatus for recording a video signal that can be displayed at all frame rates of 29.97 Hz, 59.94 Hz, 25 Hz, and 50 Hz on a recording medium, the program comprising the steps of:

generating an encoded video bit stream having a frame rate of 24 Hz or 23.976 Hz and a progressive format; and recording the encoded video bit stream on the recording medium.

A non-limiting embodiment of the present invention is a recording medium on which a computer readable program for an information processing apparatus for recording a video signal displayed at a frame rate of 29.97 Hz, 59.94 Hz, 25 Hz, or 50 Hz is recorded, the program comprising the steps of:

generating an encoded video bit stream having a size in common with an NTSC range and a PAL range, a frame rate of 24 Hz or 23.976 Hz, and a progressive format; and recording the encoded video bit stream on the recording medium.

A non-limiting embodiment of the present invention is a recording medium on which a video signal that can be displayed at all frame rates of 29.97 Hz, 59.94 Hz, 25 Hz, and 50 Hz is recorded as a compression encoded video bit stream having a size in common with an NTSC range and a PAL range, a frame rate of 24 Hz or 23.976 Hz, and a progressive format.

A non-limiting embodiment of the present invention is an information processing apparatus for reproducing from a recording medium a compression encoded video bit stream having a picture size in common with an NTSC range and a PAL range, a frame rate of 24 Hz or 23.976 Hz, and a progressive format, the information processing apparatus comprising:

means for reproducing the encoded video bit stream from the recording medium;

decompression decoding means for decoding the reproduced encoded video bit stream and generating a video signal having a frame rate of 23.976 Hz or 24 Hz and a progressive format; and video converting means for converting an output of the decompression decoding means into a video signal having a frame rate of 29.97 Hz, 59.94 Hz, 25 Hz, or 50 Hz.

A non-limiting embodiment of the present invention is a program for an information processing apparatus for reproducing from a recording medium a compression encoded video bit stream having a picture size in common with an NTSC range and a PAL range, a frame rate of 24 Hz or 23.976 Hz, and a progressive format, the program comprising the steps of:

reproducing the encoded video bit stream from the recording medium;

decoding the reproduced encoded video bit stream and generating a video signal having a frame rate of 23.976 Hz or 24 Hz and a progressive format; and converting a video signal obtained at the decompression decoding step into a video signal having a frame rate of 29.97 Hz, 59.94 Hz, 25 Hz, or 50 Hz.

A non-limiting embodiment of the present invention is a recording medium on which a computer readable program for an information processing apparatus for reproducing from a recording medium a compression encoded video bit stream having a picture size in common with an NTSC range and a PAL range, a frame rate of 24 Hz or 23.976 Hz, and a progressive format is recorded, the program comprising the steps of:

reproducing the encoded video bit stream from the recording medium;

decoding the reproduced encoded video bit stream and generating a video signal having a frame rate of 23.976 Hz or 24 Hz and a progressive format; and converting a video signal obtained at the decompression decoding step into a video signal having a frame rate of 29.97 Hz, 59.94 Hz, 25 Hz, or 50 Hz.

BRIEF DESCRIPTION OF DRAWINGS

FIG. 3 is a schematic diagram describing a conventional 2:3 pull down process.

FIG. 5 is a block diagram showing an encoder system according to the embodiment of the present invention.

FIG. 7 is a schematic diagram describing a display format converting process for a video signal according to the embodiment of the present invention.

FIG. 8 is a schematic diagram describing a converting process from 24p into 30i and a converting process from 24p into 60p.

FIG. 9 is a schematic diagram describing a converting process from 23.976p into 29.97i and a converting process from 23.976p into 59.94p.

FIGS. 12A and 12B are schematic diagrams showing a converting process from 23.976p into 25i and a converting process from 23.976p into 50p.

BEST MODES FOR CARRYING OUT THE INVENTION

Next, with reference to the accompanying drawings, an embodiment of the present invention will be described. According to the present invention, it is assumed that the video format (for example, MPEG2 format) for a recording medium is a 24 Hz (or 23.976 Hz (=24×(1000/1001) Hz) progressive format. On the other hand, as shown in FIG. 4A, as HD video television formats of effective picture area H×V (1920×1080), 29.97i (interlaced video signal having a frame rate of 29.97 Hz) for the NTSC range and 25i (interlaced video signal having a frame rate of 25 Hz) for the PAL range have been standardized.

Figure 1:
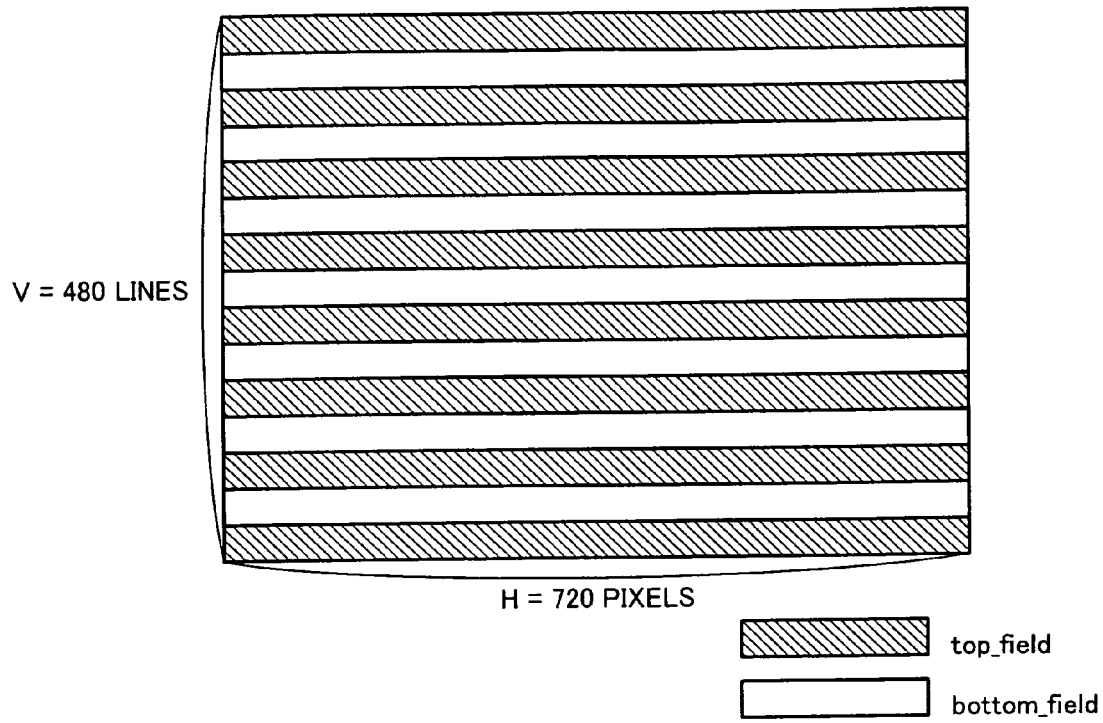
FIG. 1 is a schematic diagram describing an MPEG decoding picture format.
Figure 2:
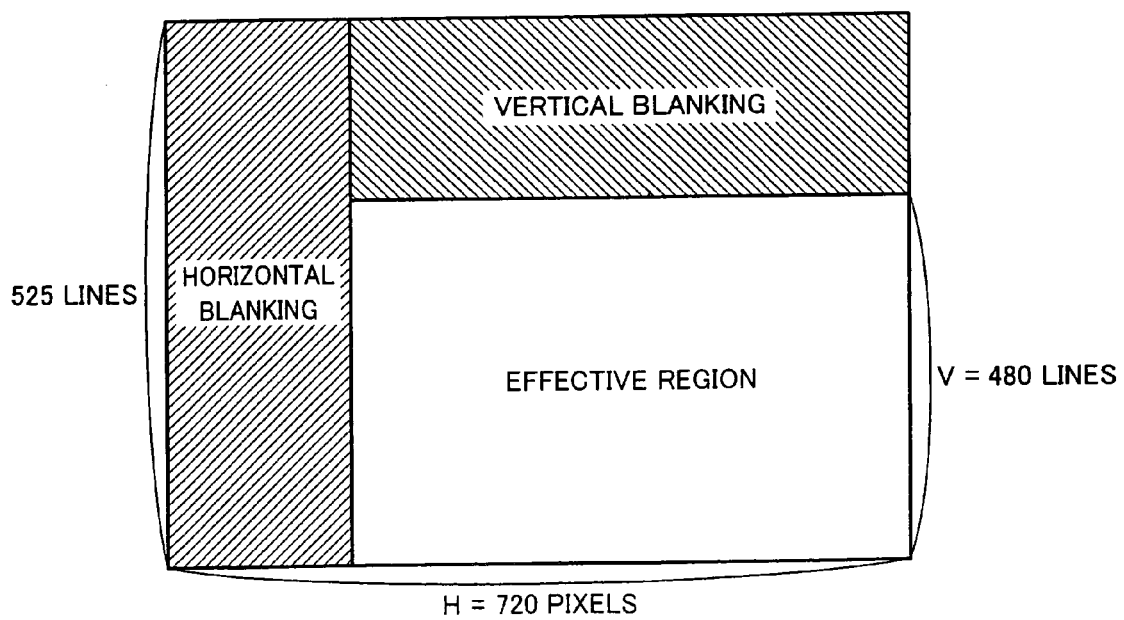
FIG. 2 is a schematic diagram describing a relation of the format of an MPEG decoding picture and the format of a transmission picture.
Figures 4A, 4B:
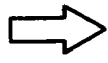
FIGS. 4A and 4B are schematic diagrams describing a format on a disc according to an embodiment of the present invention.

According to the present invention, as shown in FIG. 4B, for both the NTSC range and the PAL range, for example an MPEG2 video bit stream is recorded on a recoding medium in a 24p or 23.976p (a progressive video signal having a frame rate of 24 Hz or 23.976 Hz) video format. The present invention can be also applied to another picture size (1440×1080) of an HD video signal.

Conventionally, as shown in FIG. 4A, for effective picture area H×V (1280×720), 59.94p (a progressive video signal having a frame rate of 59.94 Hz) and 50p (a progressive video signal having a frame rate of 50 Hz) have been standardized as HD video television formats for the NTSC range and the PAL range, respectively.

In this case, according to the present invention, as shown in FIG. 4B, for both the NTSC range and the PAL range, for example an MPEG2 video bit stream is recorded on a recoding medium in 24p or 23.976p video format. A frame rate, 24 Hz, of a video format for a recording medium corresponds to 24 frames per second of an original movie source. A frame rate, 23.976 Hz, is a frequency at which a display signal of a monitor can be easily converted into a frame rate of 29.97 Hz of a display signal of a monitor. In other words, there is a relation of (23.976 Hz×(5/4)=29.97 Hz). Thus, the 2:3 pull down process for converting the frame rate of 24 Hz into the frame rate of 30 Hz can be used as it is.

On a player side that reproduces from a recording medium a movie source whose frame rate has been converted and for which an encoding process for example an MPEG2 encoding process have been performed, reproduced video data is converted into a video format in accordance with first determination that represents whether the video format of the recording medium is 24p or 23.976p and second determination that represents whether the display video format of a display monitor (for the NTSC range) is 29.97i or 59.94p or that (for the PAL range) is 25i or 50p.

Next, the embodiment of the present invention will be described. In FIG. 5, reference numeral 10 represents an MPEG2 video encoder. As an input signal, a 24 Hz (or 23.976 Hz) digital progressive video signal produced from a movie source film is prepared. The input video signal can be produced in the following two methods.

As the first method, a movie source of 24 frames per second is converted into a 24 Hz (or 23.976 Hz) progressive video signal. As the second method, a movie source is converted into a 30 Hz (or 29.97 Hz) interlaced video signal by the 2:3 pull down process. Thereafter, the interlaced video signal is inversely converted by the inverse 2:3 pull down process. As a result, a 24 Hz (or 23.976 Hz) progressive video signal is restored. When the first and second methods are compared, the first method is preferable because the amount of the process is small. Since there is a relation of 23.976 Hz (=24× (1000/1001) Hz), when the 24 Hz progressive video signal is thinned out by one frame from every 1001 frames, a 23.976 Hz progressive video signal can be generated.

The MPEG2 video encoder 10 encodes the input video signal and outputs an MPEG2 video bit stream having the following parameters.

frame_rate=24 Hz (or 23.976 Hz)
progressive_sequence=1
top_field_first=0, repeat_first_field=0

The value of frame_rate is the same as the frame rate of the input video signal (24 Hz or 23.976 Hz).

As shown in FIG. 5, an MPEG2 video bit stream (V) is multiplexed with an audio stream (A) and system information (S) by a multiplexer 11. As a result, the multiplexer 11 outputs a transport stream. An ECC (Error Correction Code) encoding portion 12 performs an error correction code encoding process for the transport stream. A modulating portion 13 performs a digital modulating process for an output of the ECC encoding portion 12. An output of the modulating portion 13 is supplied to a writing portion 14. The writing portion 14 records an output of the modulating portion 13 on a recording medium, for example an optical disc 15.

Figure 6:
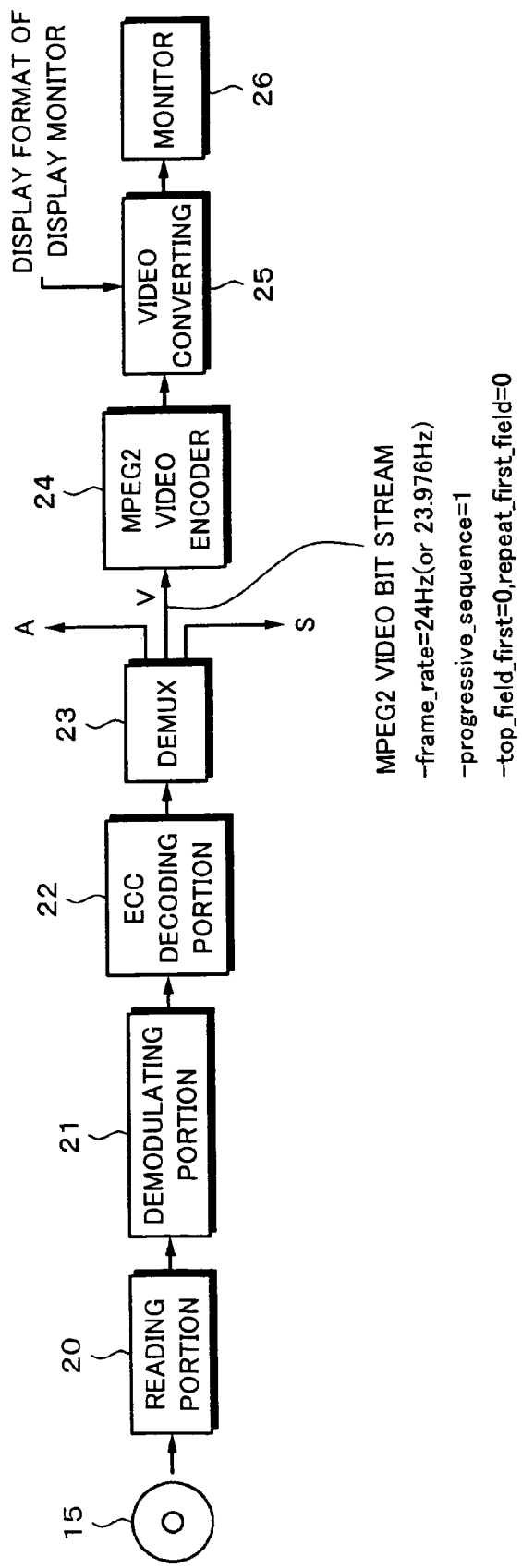
FIG. 6 is a block diagram showing a decoder system according to the embodiment of the present invention.

FIG. 6 shows a structure of an example of a decoder system that decodes an MPEG2 video bit stream reproduced from a recording medium, for example an optical disc 15 on which an output of the foregoing video encoder 10 has been recorded. Data reproduced from the optical disc 15 by a reading portion 20 is digitally demodulated by a demodulating portion 21. An ECC decoding portion 22 performs an error correction code decoding process for an output of the demodulating portion 21. An output of the ECC decoding portion 22 is supplied to a demultiplexer 23. The demultiplexer 23 demultiplexes the output of the demodulating portion 21 into a video bit stream (V), an audio stream (A), and system information (S). The video bit stream (V) is input to an MPEG2 video encoder designated by reference numeral 24. The encoder 24 outputs a 24 Hz (or 23.976 Hz) progressive moving picture to a video converting portion 25. The value of the frame rate is the same as frame rate of the MPEG2 video bit stream.

A video signal that is output from the video converting portion 25 is supplied to a monitor 26. The monitor 26 displays the video signal. A control signal that designates a display format of the display monitor is supplied to the video converting portion 25. The video converting portion 25 converts the 24 Hz (or 23.976 Hz) progressive moving picture into a video signal having a designated display format.

FIG. 7 shows a list of converting processes performed by the video converting portion 25. Each converting method will be described in the following.

For the converting processes performed by the video converting portion 25, a converting process from 24p into 30i and a converting process from 24p into 60p are performed. As a result, intermediate signals of 30i and 60p are generated. A signal reproduced from a disc is a progressive signal (24p)

composed of 24 encoded frames per second. The converting process from 24p into 30i is the same as the 2:3 pull down converting process described with reference to FIG. 3 except that the picture size is in an HD format. In other words, a process for converting two fields into three fields in accordance with a predetermined conversion pattern is performed. The first field is repeatedly generated twice every five display frames. As a result, 24p is converted into 30i. When 24p is converted into 60p, the first frame and the next frame are repeated twice and three times, respectively, every two frames of the 24p encoded frames. As a result, a 60p video signal is obtained.

FIG. 9 shows a converting process in the case that the display format is the NTSC range and the disc format is 23.976p. A converting process from 23.976p into 29.97i is a process for converting a progressive video signal having a frame rate of 23.976 Hz into an interlaced video signal having a frame rate of 23.97 Hz. A converting process from 23.976p into 59.94p is a process for converting a progressive video signal having a frame rate of 23.976 Hz into a progressive video signal having a frame rate of 59.94 Hz.

When 23.976p is converted into 29.97i, like the converting process from 24p into 30i shown in FIG. 8, a 23.976p encoded frame is converted into an interlaced video signal by the 2:3 pull down process. When 23.976p is converted into 59.94p, like the converting process from 24p into 60p shown in FIG. 8, the first frame and the next frame are repeated twice and three times, respectively, every two frames of the 23.976p encoded frames. As a result, a 59.94 Hz progressive video signal is obtained.

Figure 10A:
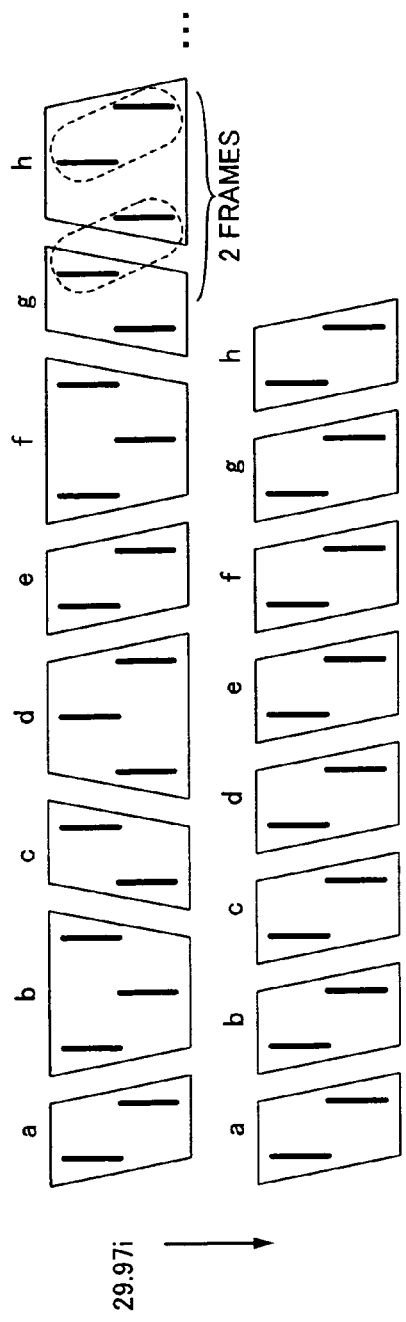
FIGS. 10A and 10B are schematic diagrams describing a converting process from 24p into 29.97i and a converting process from 24p into 59.94p.
Figure 10B:
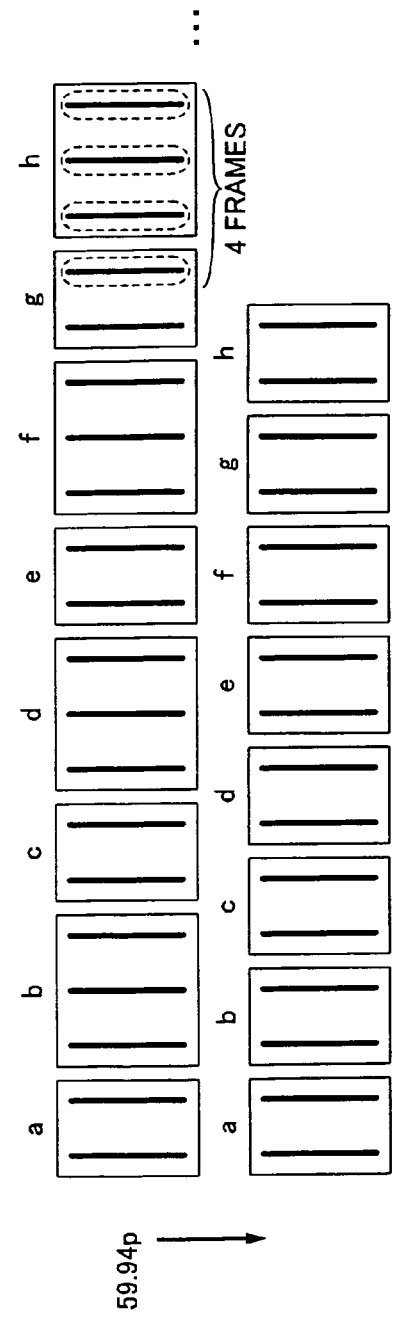

FIG. 10 shows a converting process in the case that the display format is the NTSC range and the disc format is 24p. A converting process from 24p into 29.97i is a process for converting a progressive video signal having a frame rate of 24 Hz into an interlaced video signal having a frame rate of 29.97 Hz. A converting process from 24p into 59.94p is a process for converting a progressive video signal having a frame rate of 24 Hz into a progressive video signal having a frame rate of 59.94 Hz.

For the NTSC range, the converting process from 24p into 29.97i and the converting process from 24p into 59.94i can be performed by adding another process for 30i generated from 24p and a video signal as an intermediate signal of 60p. Since there is a relation of 29.97 Hz (=30×(1000/1001) Hz), by thinning out one display frame from every 1001 display frames of the 30i signal, a 29.97i signal can be generated. In addition, since there is a relation of $(1/60) \times 1001 \times (1/1000) = (1/59.94)$, by thinning out one display frame from every 1001 display frames of the 60p signal, a 59.94p signal can be generated.

Next, a practical example of the thin-out process will be described. A 30i signal for one minute is composed of 1800 display frames. Thus, by thinning out two frames every minute except for 0, 10, 20, 30, 40, and 50 minutes, one display frame can be substantially thinned out from every 1001 display frames. As a result, a 29.97i signal can be generated. In addition, a 60p signal for one minute is composed of 3600 frames. Thus, by thinning out four frames every minute except for 0, 10, 20, 30, 40, and 50 minutes, one display frame can be substantially thinned out from every 1001 display frames. As a result, a 59.94p signal can be generated. A process for not thinning out a display frame is normally referred to as a process for a drop frame.

Figure 11:
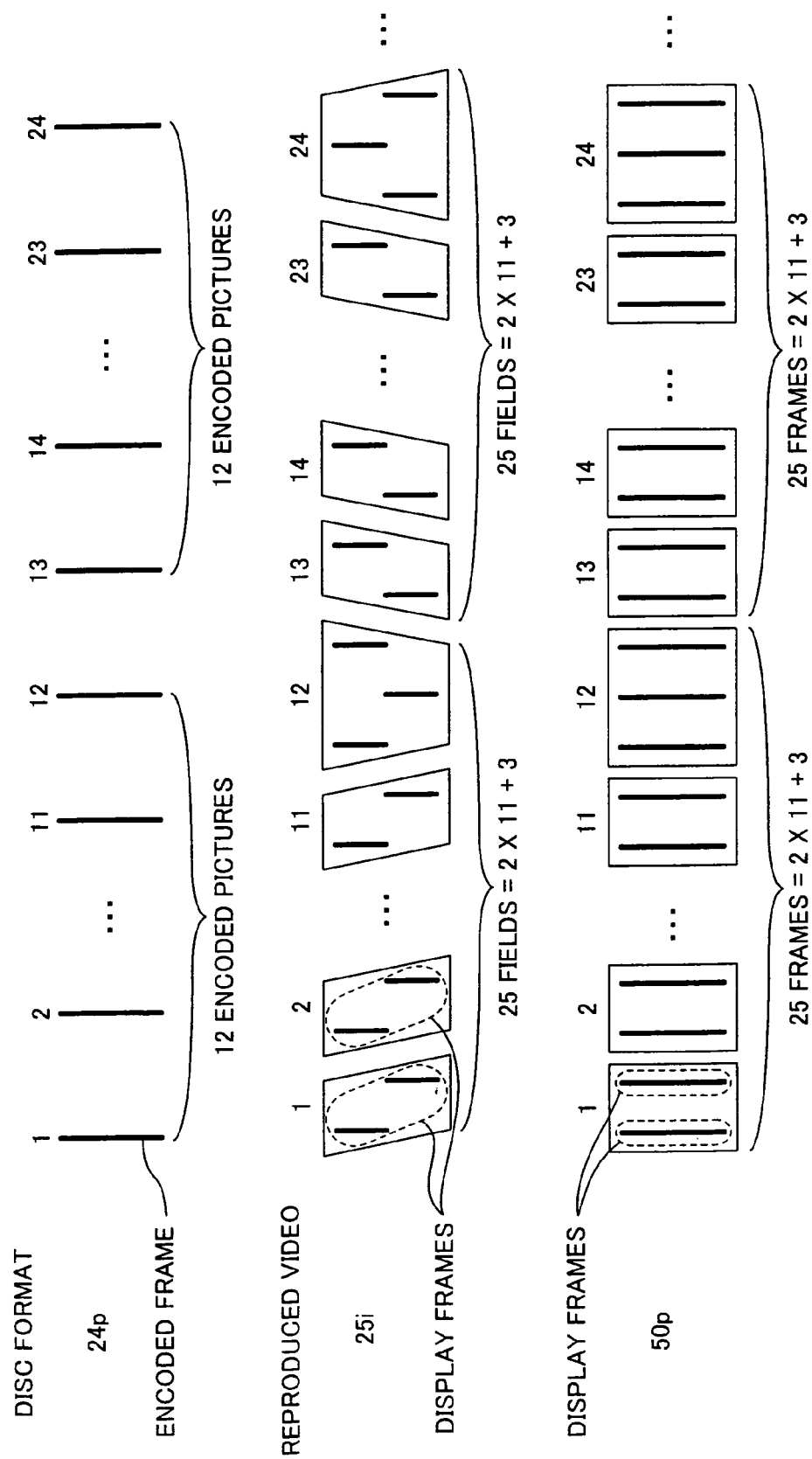
FIG. 11 is a schematic diagram describing a converting process from 24p into 25i and a converting process from 24p into 50p.

FIG. 11 shows a converting process in the case that the display format is the PAL range and that the disc format is 24p. A converting process from 24p into 25i is a process for converting a progressive video signal having a frame rate of 24 Hz into an interlaced video signal having a frame rate of 25 Hz. A converting process from 24p into 50p is a process for converting a progressive video signal having a frame rate of 24 Hz into a progressive video signal having a frame rate of 50 Hz.

When 24p is converted into 25i, the first 11 encoded frames and the last one encoded frame are repeatedly displayed for two fields and for three fields, respectively, every 12 encoded frames. As a result, an interlaced video signal having a frame rate of 25 Hz is generated. When 24p is converted into 50p, the first 11 encoded frames and the last one encoded frame are repeatedly displayed for two frames and three frames, respectively, every 12 encoded frames. As a result, a progressive video signal having a frame rate of 50 Hz is generated.

FIG. 12 shows a converting process in the case that the display format is the PAL range and that the disc format is 23.976p. A converting process from 23.976p into 25i is a process for converting a progressive video signal having a frame rate of 23.976 Hz into an interlaced video signal having a frame rate of 25 Hz. A converting process from 23.976p into 50p is a process for converting a progressive video signal having a frame rate of 23.976 Hz into a progressive video signal having a frame rate of 50 Hz.

When 23.976p is converted into 25i, the first 11 encoded frames and the last one encoded frame are repeatedly displayed for two fields and three fields, respectively, every 12 encoded frames. In addition, one display frame is inserted into every 1000 display frames. As a result, an interlaced video signal having a frame rate of 25 Hz is generated. When 23.976p is converted into 50p, the first 11 encoded frames and the last one encoded frame are repeatedly displayed for two frames and three frames, respectively, every 12 encoded frames. In addition, two display frames are inserted into every 2000 display frames. As a result, a progressive video signal having a frame rate of 50 Hz is generated.

Figure 13:
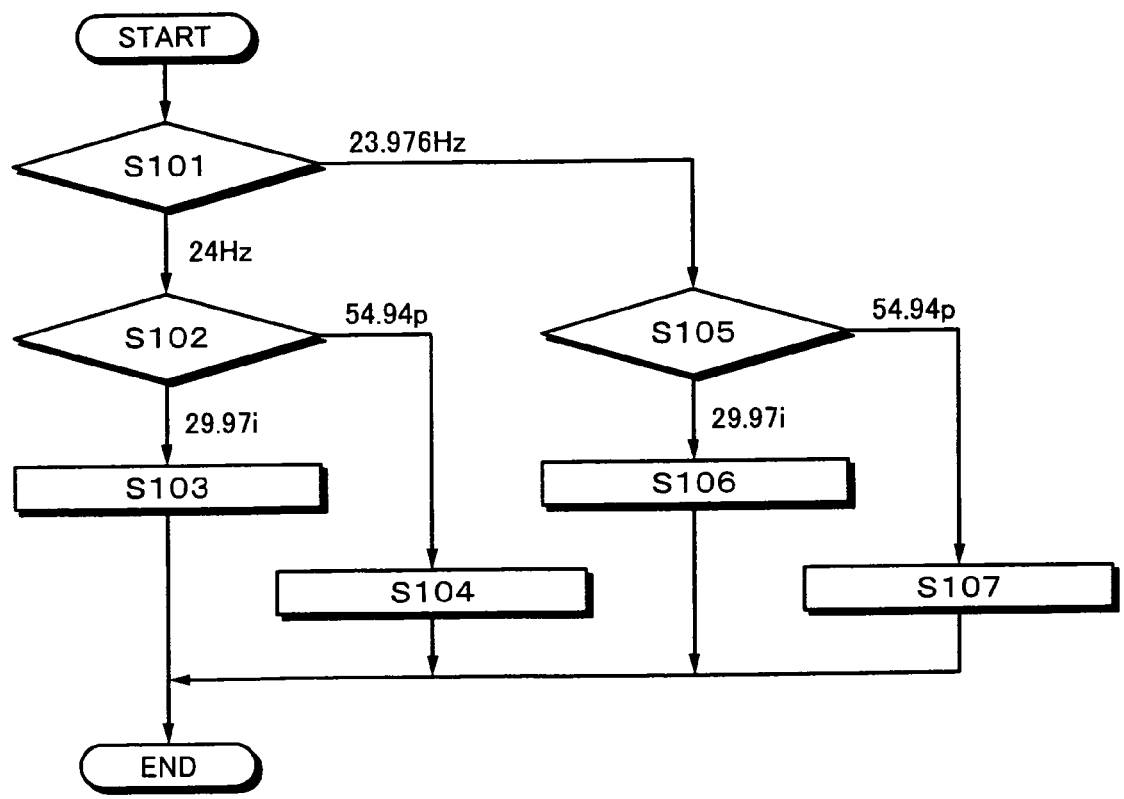
FIG. 13 is a flow chart showing a flow of a process of a reproducing method applied for the NTSC range according to the present invention.

FIG. 13 is a flow chart applied for a reproducing method in the case that the display format is the NTSC range and the disc format is 24p or 23.976p. At the first step S101, it is determined whether the frame rate of the disc format is 24 Hz or 23.976 Hz in accordance with information of a sequence layer of an MPEG2 video bit stream reproduced from the disc. When the frame rate is 23.976 Hz, the process advances to step S102. When the frame rate is 24 Hz, the process advances to step S105.

At step S102, it is determined whether or not the display format of the monitor is 29.97i or 54.94p. When the display format is 29.97i, the process advances to step S103. When the display format is 54.94p, the process advances to step S104.

At step S103, a converting process from 24p into 29.97i is performed. In other words, as described with reference to FIG. 8, two fields and three fields are repeatedly displayed every two encoded frames. As a result, a 30i video signal is generated. In addition, as described with reference to FIG. 10, a process for thinning out one display frame from every 1000 display frames of the 30i video signal is preformed. As a result, an interlaced video signal having a frame rate of 29.97 Hz is generated.

At step S104, a converting process from 24p into 54.94p is performed. In other words, as described with reference to FIG. 8, two frames and three frames are repeatedly displayed every two encoded frames. As a result a 60p video signal is generated. In addition, as described with reference to FIG. 10, a process for thinning out one display frame from every 1000 display frames of the 60p video signal is performed. As a result, a progressive video signal having a frame rate of 59.94 Hz is generated.

When the determined result at step S101 represents that the disc format is 23.976 Hz, at step S105, it is determined whether the display format of the monitor is 29.97i or 54.94p. When the display format is 29.97i, the process advances to step S106. When the display format is 54.94p, the process advances to step S107.

At step S106, a converting process from 23.976p into 29.97i is performed. In other words, as described with reference to FIG. 9, a process for repeatedly displaying two fields and three fields every two encoded frames is performed. As a result, an interlaced video signal having a frame rate of 29.97 Hz is generated.

At step S107, a converting process from 23.976p into 54.94p is performed. In other words, as described with reference to FIG. 9, a process for repeatedly displaying two frames and three frames every two encoded frames is preformed. As a result, a progressive video signal having a frame rate of 59.94 Hz is generated.

Figure 14:
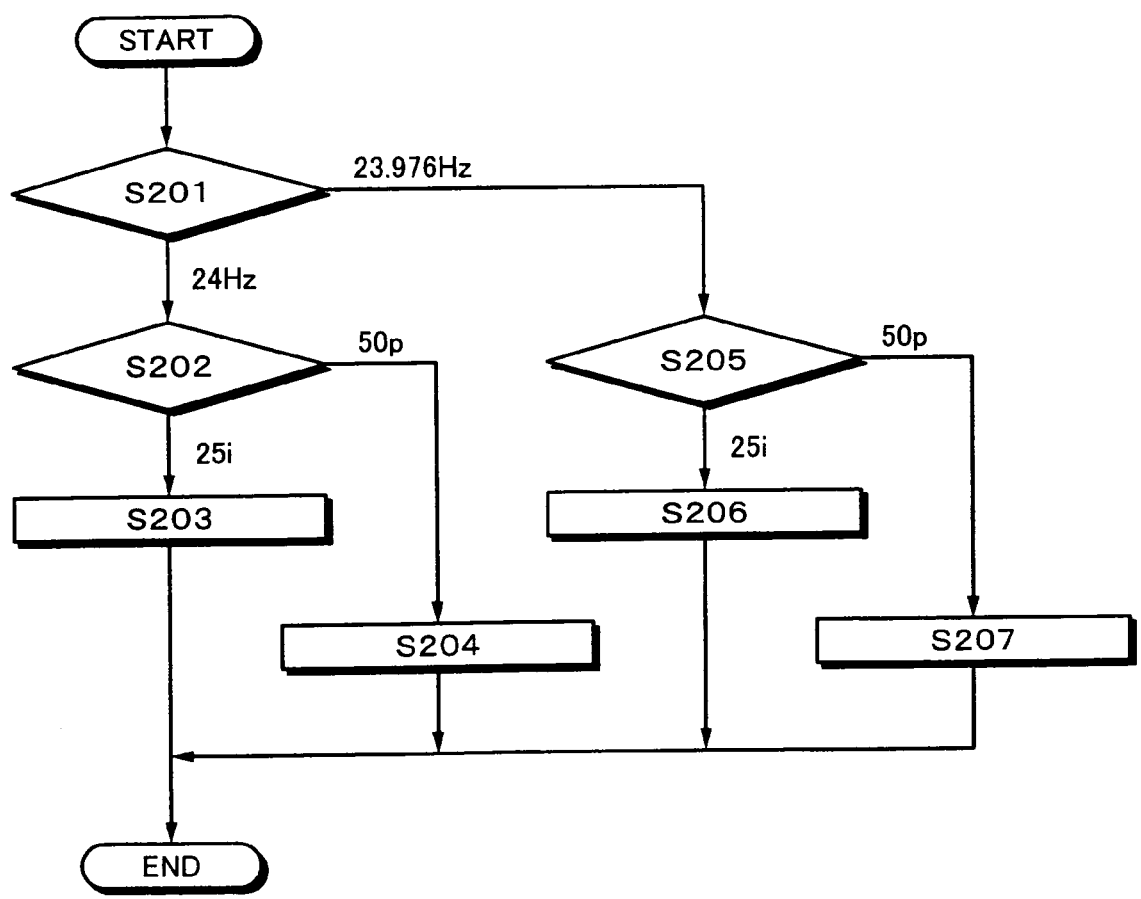
FIG. 14 is a flow chart showing a flow of a process of a reproducing method applied for the PAL range according to the present invention.

FIG. 14 a flow chart applied for a reproducing method in the case that the display format is the PAL range and the disc format is 24p or 23.976p. At the first step S201, it is determined whether the frame rate of the disc format is 24 Hz or 23.976 Hz in accordance with information of the sequence layer. When the frame rate is 24 Hz, the process advances to step S202. When the frame rate is 23.976 Hz, the process advances to step S205.

At step S202, it is determined whether the display format of the monitor is 25i or 50p. When the display format is 25i, the process advances to step S203. When the display format is 50p, the process advances to step S204.

At step S203, a converting process from 24p into 25i is performed. In other words, as described with reference to FIG. 11, the first 11 encoded frames and the last one encoded frame are repeatedly displayed for two fields and three fields, respectively, every 12 encoded frames of 24p. As a result, an interlaced video signal having a frame rate of 25 Hz is generated.

At step S204, a converting process from 24p into 50p is performed. In other words, as described with reference to FIG. 11, the first 11 encoded frames and the last one encoded frame are repeatedly displayed for two frames and three frames, respectively, every 12 encoded frames. As a result, a progressive video signal having a frame rate of 50 Hz is generated.

When the determined result at step S201 represents that the disc format is 23.976 Hz, at step S205, it is determined whether the display format of the monitor is 25i or 50p. When the display format is 25i, the process advances to step S206. When the display format is 50p, the process advances to step S207.

At step S206, a converting process from 23.976p into 25i is performed. In other words, the first 11 encoded frames and the last one encoded frame are repeatedly displayed for two fields and three fields, respectively, every 12 encoded frames. In addition, as described with reference to FIG. 12, one display frame is inserted into every 1000 display frames. As a result, an interlaced video signal having a frame rate of 25 Hz is generated.

At step S207, a converting process from 23.976p into 50p is performed. In other words, the first 11 encoded frames and the last one encoded frame are repeatedly displayed for two frames and three frames, respectively, every 12 encoded frames. In addition, as described with reference to FIG. 12, one display frame is inserted into every 1000 display frames. As a result, a progressive video signal having a frame rate of 50 Hz is generated.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, according to the present invention, the frame rate of a video signal recorded on a recording medium may be fixed to one of 24 Hz or 23.976 Hz. In addition, the present invention can be applied to the case that a movie source is converted into a video format other than MPEG2. In addition, the present invention can be applied to the case that bit stream data is recorded in a recording medium other than a disc, for example a semiconductor memory. In addition, the video converting portion 25 may be accomplished by software using a microprocessor and a memory that stores a program as well as hardware.

Conventionally, when a video signal (having a frame rate of 29.97 Hz for the NTSC range and a frame rate of 25 Hz for the PAL range) obtained from a film material of 24 frames per second is encoded, different processes are performed for the NTSC range and PAL range. In contrast, according to the present invention, a common encoding process can be performed by a common encoder system for both the NTSC range and PAL range.

For the NTSC range, it was difficult to convert an interlaced moving picture having a frame rate of 29.97 Hz into a progressive moving picture having a frame rate of 59.94 Hz. In contrast, according to the present invention, a progressive moving picture is recorded on a recording medium. Thus, according to the present invention, for the NTSC range, a progressive moving picture having a frame rate of 24 Hz or 23.976 Hz can be easily converted into an interlaced moving picture having a frame rate of 29.97 Hz or a progressive moving picture having a frame rate of 59.94 Hz and displayed. In addition, according to the present invention, for the PAL range, a progressive moving picture having a frame rate of 24 Hz or 23.976 Hz can be easily converted into an interlaced moving picture having a frame rate of 25 Hz or a progressive moving picture having a frame rate of 50 Hz and displayed.

According to the present invention, for the PAL range, a problem of which the reproduction speed of a video signal is faster than that of the original movie by (25/24 times). Thus, the reproduction speed of the video signal becomes the same as that of the original.

When a movie is taped by a HDTV video camera having a frame rate of 24 Hz, according to the present invention, since a video material can be directly input to an MPEG video encoder, the video material can be conveniently handled.

DESCRIPTION OF REFERENCE NUMERALS

10 MPEG2 VIDEO ENCODER
24 MPEG2 VIDEO DECODER
25 VIDEO CONVERTING PORTION
26 MONITOR
S101, S201 Frame_rate=24 or 23.976?
S102, S105 29.97i or 54.94p?
S103 REPEATEDLY DISPLAY TWO FIELDS AND THREE FIELDS EVERY TWO ENCODED FRAMES. IN ADDITION, THIN OUT ONE DISPLAY FRAME FROM EVERY 1000 DISPLAY FRAMES.
S104 REPEATEDLY DISPLAY TWO FRAMES AND THREE FRAMES EVERY TWO ENCODED FRAMES. IN ADDITION, THIN OUT ONE DISPLAY FRAME FROM EVERY 1000 DISPLAY FRAMES.

S106 REPEATEDLY DISPLAY TWO FIELDS AND THREE FIELDS EVERY TWO ENCODED FRAMES.
S107 REPEATEDLY DISPLAY TWO FRAMES AND THREE FRAMES EVERY TWO ENCODED FRAMES.
S202, S205 25i or 50p?
S203 REPEATEDLY DISPLAY FIRST 11 ENCODED FRAMES AND LAST ONE ENCODED FRAME FOR TWO FIELDS AND THREE FIELD, RESPECTIVELY, EVERY 12 ENCODED FRAMES.
S204 REPEATEDLY DISPLAY FIRST 11 ENCODED FRAMES AND LAST ONE ENCODED FRAME FOR TWO FRAMES AND THREE FRAMES, RESPECTIVELY, EVERY 12 ENCODED FRAMES.
S206 REPEATEDLY DISPLAY FIRST 11 ENCODED FRAMES AND LAST ONE ENCODED FRAME FOR TWO FIELDS AND THREE FIELDS, RESPECTIVELY, EVERY 12 ENCODED FRAMES. IN ADDITION, INSERT ONE DISPLAY FRAME INTO EVERY 1000 DISPLAY FRAMES.
S207 REPEATEDLY DISPLAY FIRST 11 ENCODED FRAMES AND LAST ONE ENCODED FRAME FOR TWO FIELDS AND THREE FRAMES, RESPECTIVELY, EVERY 12 ENCODED FRAMES. IN ADDITION, INSERT ONE DISPLAY FRAME INTO EVERY 1000 DISPLAY FRAMES.

The invention claimed is:

1. An information processing apparatus for reproducing from a recording medium a compression encoded video bit stream having a picture size in common with an NTSC range and a PAL range, a frame rate of 24 Hz or 23.976 Hz, and a progressive format, the information processing apparatus comprising:
when the display format is the PAL range,
means for reproducing the encoded video bit stream from the recording medium;
decompression decoding means for decoding the reproduced encoded video bit stream and generating a video signal having a frame rate of 23.976 Hz or 24 Hz and a progressive format;
video converting means for converting an output of the decompression decoding means into a video signal having a frame rate of 29.97 Hz, 59.94 Hz, 25 Hz, or 50 Hz;
first determining means for determining whether the frame rate of the video signal on the recording medium is 24 Hz or 23.976 Hz; and
second determining means for determining whether the display format of the video signal is 25 Hz or 50 Hz;
wherein when the first determined value of the first determining means is 24 Hz, and
when the second determined value of the second determining means is 25 Hz, the video converting means performs processing of displaying the first 11 encoded frames and the last one encoded frame repeatedly for two frames and three frames, respectively, every 12 encoded frames, and further performs processing of inserting one display frame into every 1000 display frames, and
when the second determined value of the second determining means is 50 Hz, the video converting means performs processing of displaying the first 11 encoded frames and the last one encoded frame repeatedly for two frames and three frames, respectively, every 12 encoded frames, and further performs processing of inserting one display frame into every 1000 display frames.

2. An information processing apparatus for reproducing from a recording medium a compression encoded video bit stream having a picture size in common with an NTSC range and a PAL range, a frame rate of 24 Hz or 23.976 Hz, and a progressive format, the information processing apparatus comprising:
when the display format is the NTSC range,
means for reproducing the encoded video bit stream from the recording medium;
decompression decoding means for decoding the reproduced encoded video bit stream and generating a video signal having a frame rate of 23.976 Hz or 24 Hz and a progressive format;
video converting means for converting an output of the decompression decoding means into a video signal having a frame rate of 29.97 Hz, 59.94 Hz, 25 Hz, or 50 Hz:
first determining means for determining whether the frame rate of video signal on the recording medium is 24 Hz or 23.976 Hz; and
second determining means for determining whether the display format of video signal is 29.97 Hz or 59.94 Hz,
wherein when a first determined value of the first determining means is 24 Hz, and
when a second determined value of the second determining means is 29.97 Hz, the video converting means performs processing of displaying two fields and three fields repeatedly every two encoded frames and further performs processing of thinning out one display frame from every 1000 display frames of the video signal, and
when the second determined value of the second determining means is 59.94 Hz, the video converting means performs processing of displaying two frames and three frames repeatedly every two encoded frames and further performs processing of thinning out one display frame from every 1000 display frames of the video signal,
wherein when the first determined value of the first determining means is 23.976 Hz, and
when the second determined value of the second determining means is 25 Hz, the video converting means performs processing of displaying the first 11 encoded frames and the last one encoded frame repeatedly for two frames and three frames, respectively, every 12 encoded frames, and
when the second determined value of the second determining means is 50 Hz, the video converting means performs processing of displaying the first 11 encoded frames and the last one encoded frame repeatedly for two frames and three frames, respectively, every 12 encoded frames.

3. A computer-readable storage medium storing instructions which when executed by a computer perform an information processing method, for an information processing apparatus, for reproducing from a recording medium a compression encoded video bit stream having a picture size in common with an NTSC range and a PAL range, a frame rate of 24 Hz or 23.976 Hz, and a progressive format is recorded, the method comprising:
when the display format is the NTSC range,
reproducing the encoded video bit stream from the recording medium;
decoding the reproduced encoded video bit stream and generating a video signal having a frame rate of 23.976 Hz and a progressive format; and
converting a video signal obtained at the decompression decoding step into a video signal having a frame rate of 29.97 Hz, 59.94 Hz, 25 Hz, or 50 Hz;
determining whether the frame rate of the video signal on the recording medium is 24 Hz or 23.976 Hz; and determining whether the display format of the video signal is 29.97 Hz or 59.94 Hz;

wherein when it is determined that the frame rate of the video signal is 24 Hz, and when it is determined that the display format of the video signal is 29.97 Hz, video converting is performed which includes displaying two fields and three fields repeatedly every two encoded frames and thinning out one display frame from every 1000 display frames of the video signal, and when it is determined that the display format of the video signal is 59.94 Hz, video converting is performed which includes displaying two frames and three frames repeatedly every two encoded frames and thinning out one display frame from every 1000 display frames of the video signal, wherein when it is determined that the frame rate of the video signal is 23.976 Hz, and when it is determined that the display format of the video signal is 25 Hz, video converting is performed that includes displaying the first 11 encoded frames and the last one encoded frame repeatedly for two frames and three frames, respectively, every 12 encoded frames and when it is determined that the display format of the video signal is 50 Hz, video converting is performed that includes displaying the first 11 encoded frames and the last one encoded frame repeatedly for two frames and three frames, respectively, every 12 encoded frames.

4. An information processing method for an information processing apparatus for reproducing from a recording medium a compression encoded video bit stream having a picture size in common with an NTSC range and a PAL range, a frame rate of 24 Hz or 23.976 Hz, and a progressive format is recorded, the method comprising:

when the display format is the NTSC range, reproducing in the information processing apparatus the encoded video bit stream from the recording medium;

decoding in the information processing apparatus the reproduced encoded video bit stream and generating a video signal having a frame rate of 23.976 Hz and a progressive format;

converting in the information processing apparatus a video signal obtained in the decoding into a video signal having a frame rate of 29.97 Hz, 59.94 Hz, 25 Hz, or 50 Hz;

determining in the information processing apparatus whether the frame rate of the video signal on the recording medium is 24 Hz or 23.976 Hz; and determining in the information processing apparatus whether the display format of the video signal is 29.97 Hz or 59.94 Hz, wherein when it is determined that the frame rate of the video signal is 24 Hz, and when it is determined that the display format of the video signal is 29.97 Hz, video converting is performed which includes displaying two fields and three fields repeatedly every two encoded frames and thinning out one display frame from every 1000 display frames of the video signal, and when it is determined that the display format of the video signal is 59.94 Hz, video converting is performed which includes displaying two frames and three frames repeatedly every two encoded frames and thinning out one display frame from every 1000 display frames of the video signal, wherein when it is determined that the frame rate of the video signal is 23.976 Hz, and when it is determined that the display format of the video signal is 25 Hz, video converting is performed that includes displaying the first 11 encoded frames and the last one encoded frame repeatedly for two frames and three frames, respectively, every 12 encoded frames, and when it is determined that the display format of the video signal is 50 Hz, video converting is performed that includes displaying the first 11 encoded frames and the last one encoded frame repeatedly for two frames and three frames, respectively, every 12 encoded frames.

5. An information processing method for an information processing apparatus for reproducing from a recording medium a compression encoded video bit stream having a picture size in common with an NTSC range and a PAL range, a frame rate of 24 Hz or 23.976 Hz, and a progressive format, the information processing method comprising:

when the display format is the PAL range, reproducing in the in the information processing apparatus the encoded video bit stream from the recording medium;

decoding in the information processing apparatus the reproduced encoded video bit stream and generating a video signal having a frame rate of 23.976 Hz or 24 Hz and a progressive format;

converting in the information processing apparatus an output of the decoding into a video signal having a frame rate of 29.97 Hz, 59.94 Hz, 25 Hz, or 50 Hz;

determining in the information processing apparatus whether the frame rate of the video signal on the recording medium is 24 Hz or 23.976 Hz; and determining in the information processing apparatus whether the display format of the video signal is 25 Hz or 50 Hz;

wherein when it is determined that the frame rate of the video signal is 24 Hz, and when it is determined that the display format of the video signal is 25 Hz, video converting is performed which includes displaying the first 11 encoded frames and the last one encoded frame repeatedly for two frames and three frames, respectively, every 12 encoded frames, and inserting one display frame into every 1000 display frames, and when it is determined that the display format of the video signal is 50 Hz, video converting is performed which includes displaying the first 11 encoded frames and the last one encoded frame repeatedly for two frames and three frames, respectively, every 12 encoded frames, and inserting one display frame into every 1000 display frames.

6. A computer-readable storage medium storing instructions which when executed by a computer perform an information processing method, for an information processing apparatus, for reproducing from a recording medium a compression encoded video bit stream having a picture size in common with an NTSC range and a PAL range, a frame rate of 24 Hz or 23.976 Hz, and a progressive format, the method comprising:

when the display format is the PAL range, reproducing in the in the information processing apparatus the encoded video bit stream from the recording medium;

decoding in the information processing apparatus the reproduced encoded video bit stream and generating a video signal having a frame rate of 23.976 Hz or 24 Hz and a progressive format;

converting in the information processing apparatus an output of the decoding into a video signal having a frame rate of 29.97 Hz, 59.94 Hz, 25 Hz, or 50 Hz;

determining in the information processing apparatus whether the frame rate of the video signal on the recording medium is 24 Hz or 23.976 Hz; and determining in the information processing apparatus whether the display format of the video signal is 25 Hz or 50 Hz;

wherein when it is determined that the frame rate of the video signal is 24 Hz, and when it is determined that the display format of the video signal is 25 Hz, video converting is performed which includes displaying the first 11 encoded frames and the last one encoded frame repeatedly for two frames and three frames, respectively, every 12 encoded frames, and inserting one display frame into every 1000 display frames, and when it is determined that the display format of the video signal is 50 Hz, video converting is performed which includes displaying the first 11 encoded frames and the last one encoded frame repeatedly for two frames and three frames, respectively, every 12 encoded frames, and inserting one display frame into every 1000 display frames.

* * * * *

UNITED STATES PATENT AND TRADEMARK OFFICE
CERTIFICATE OF CORRECTION

| | | |
|---|---|---|
| PATENT NO. | : 7,596,297 B2 | Page 1 of 1 |
| APPLICATION NO. | : 10/494048 | |
| DATED | : September 29, 2009 | |
| INVENTOR(S) | : Kato | |

It is certified that error appears in the above-identified patent and that said Letters Patent is hereby corrected as shown below:

On the Title Page,

Item [*] Notice: Subject to any disclaimer, the term of this patent is extended or adjusted under 35 U.S.C. by 739 days.

Delete the phrase "by 739 days" and insert --by 1076 days--

Signed and Sealed this

Twentieth Day of July, 2010

David J. Kappos
*Director of the United States Patent and Trademark Office*